United States Patent [19]

Fasano

[11] 4,288,660
[45] Sep. 8, 1981

[54] TEST CORD FOR TELEPHONE CIRCUITS
[75] Inventor: Michael Fasano, Syosset, N.Y.
[73] Assignee: Porta Systems Corp., Syosset, N.Y.
[21] Appl. No.: 135,921
[22] Filed: Mar. 31, 1980
[51] Int. Cl.³ .................. H04M 1/00; H04M 3/22; H04M 1/24
[52] U.S. Cl. .................. 179/1 PC; 179/175; 339/75 M
[58] Field of Search .......... 179/1 PC, 175, 175.1 R, 179/91 R, 91 A; 339/75 R, 75 M, 91 R, 154 R, 154 A, 155 R, 156 R, 157 R, 158 R, 159 R, 166 R, 176 M; 324/158 R, 53

[56] References Cited
U.S. PATENT DOCUMENTS 3,916,103  10/1975  Morrell et al. .......... 179/1 PC
4,002,861  1/1977   Putt ....................... 179/175
4,209,671  6/1980   Charles et al. ......... 179/175

Primary Examiner—Thomas A. Robinson
Attorney, Agent, or Firm—Charles E. Temko

[57] ABSTRACT

A test cord including a plug suitable for testing individual subscriber circuits, terminals of which appear on a protector block mounted on a telephone main frame. The cord includes a terminal plug adapted to engage the exposed end of a telephone circuit protector module to enter recesses therein to provide electrical conductivity therebetween. The plug and module are provided with corresponding detenting means for maintaining the same in engaged condition, and corresponding guiding means to prevent such engagement in an improper mutual orientation.

4 Claims, 5 Drawing Figures

TEST CORD FOR TELEPHONE CIRCUITS

BACKGROUND OF THE INVENTION

This invention relates generally to the field of telephony, and more particularly to an improved test cord for testing individual subscriber circuits appearing on a telephone main frame in a telephone office. Devices of this general type are known in the art, and the invention lies in specific constructional details which permit improved ease of manufacture, as well as facilitated use by telephone service personnel.

As is known in the art, it is common practice to interconnect incoming subscriber circuits to a telephone main frame, from where they are routed to office switching equipment. The main frame is a convenient point at which to install individual protective devices, usually in the form of a small module to prevent excess current surges which may be present on the subscriber lines from reaching the office equipment and damaging the same. It is usual to provide on a protector block some means of access for test equipment on the main frame as well. Prior art protector blocks, in addition to providing terminals for engaging the protector modules, also provide a separate area or test field at which test equipment in the form of probes may be engaged. Unfortunately, the test field occupies a substantial amount of area on the protector block which would otherwise be better employed to accommodate terminals for additional subscriber circuits. The problem of utilization of existing space on the main frame has been sufficiently serious that protector modules have been developed in which test points are provided on the exposed ends of the modules thereby eliminating the necessity of providing separate test fields and the accompanying utilization of substantial space on the frame. The test points are recessed between small openings in the outer end of the housing of the module and are accessible to service personnel once the proper module is identified.

It is known to provide a plug type multicontact probe which engages the exposed end of the module during the testing procedure. The known types of such construction are in the form of an elongated plug having a cross section corresponding to that of the protector module, and having rigid prongs which engage corresponding openings in the module to effect the necessary contacts. A recess is provided in the forward end of the plug to clear the manually engageable handle on the protector module during the engagement. Because of the purchase obtained on the projecting prongs entering the body of the module, disengagement of the plug from the module after completion of the test procedure is often difficult, and on occasion results in simultaneous disengagement of the protector module from the associated protector block.

SUMMARY OF THE INVENTION

Briefly stated, the invention contemplates the provision of an improved test cord assembly of the class described in which the engagement of the terminals on the exposed end of a protector module is accomplished by detent means cooperating solely with the projecting handle extending from the exposed surface of the module housing. Electrical connections are accomplished by the contact of spring mounted pins which project into oversize corresponding openings in the module housing in such manner that such communication is established without frictional purchase on the pins. Removal of the plug requires only overcoming the resilient purchase of the detent means using a force much below that necessary to dislodge the module from the connector block.

BRIEF DESCRIPTION OF THE DRAWING

In the drawing, to which reference will be made in the specification, similar reference characters have been employed to designate corresponding parts throughout the several views.

DETAILED DESCRIPTION OF THE DISCLOSED EMBODIMENT

Figure 1:
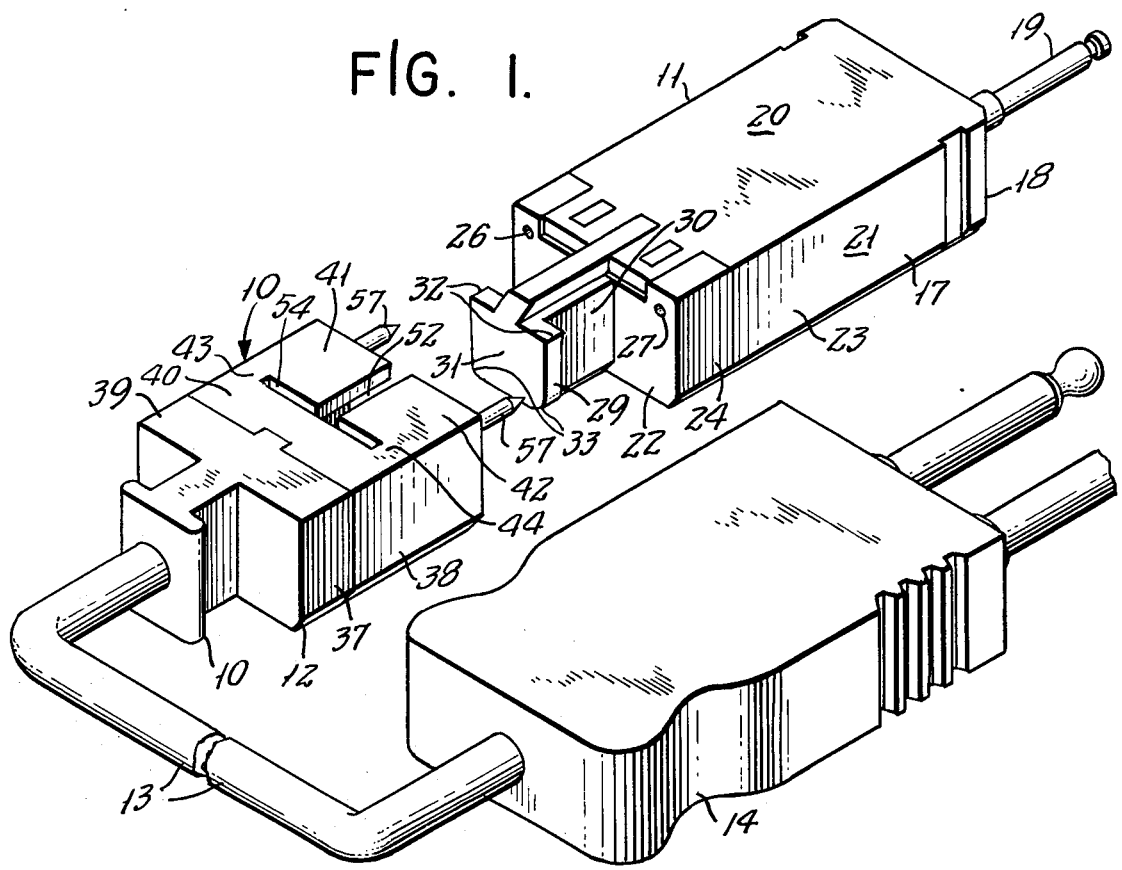
FIG. 1 is an exploded view in perspective of an embodiment of the invention showing engagement with a corresponding protector module.
Figure 2:
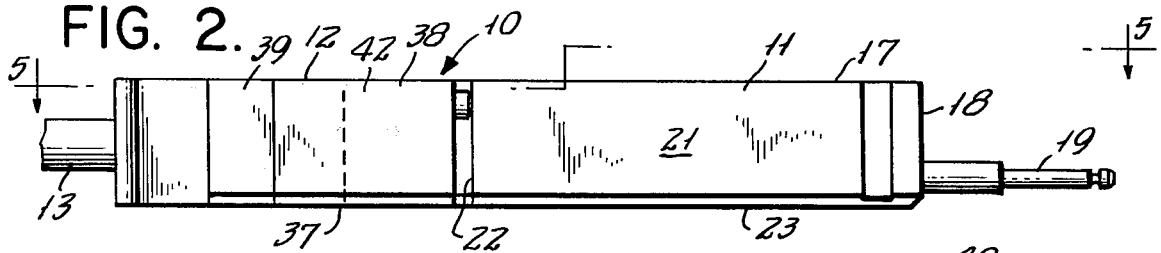
FIG. 2 is a side elevational view showing a fully engaged plug element and protector module.

In accordance with the invention, the device, generally indicated by reference character 10, is illustrated in conjunction with a protector module element 11 of known type. It comprises generally a plug element 12, a connecting cord 13, and suitable opposite terminal elements 14 of known type.

The module element 11 includes a generally rectangularly shaped housing 17 having an inner end 18 from which a grounding prong 19 projects. Other terminals (not shown) provide means for communicating with a known connector block in well known manner. The housing includes a pair of larger side surfaces 20, a pair of smaller side surfaces 21 and an outer end surface 22. For convenience in assembly, the housing is usually formed to include a main hollow body 23 and a cap-like end member 24.

Figure 3:
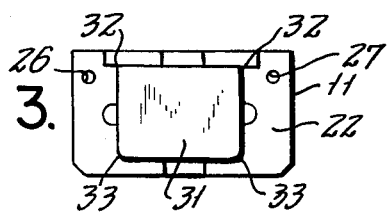
FIG. 3 is an end elevational view of the protector module.

The end surface 22 is provided with first and second openings 26-27 affording access to electrically conductive terminals (not shown) disposed thereunder, which communicate with terminals at the inner end 18. Extending outwardly from the end surface 22 is a T-shaped handle member 29 which provides a convenient means for engaging and removing the module from a connector block. The member 29 includes a generally centrally disposed web 30 and a transversely extending terminal member 31. As best seen in FIG. 3, the transverse member 31 has an outer surface of non-symmetrical configuration, including a pair of right angle corners 32 and a pair of rounded corners 33.

The plug element 12 includes a housing 37, the cross section of which corresponds to that of the module element 11. It includes a flexible body 38 and a cap-like end member 39. The body 38 includes a generally rectangular base 40 from which first and second engagement members 41-42 project. The members 41-42 are mounted on the base by flexible webs 43 and 44 affording a limited amount of resilient lateral movement.

Figure 4:
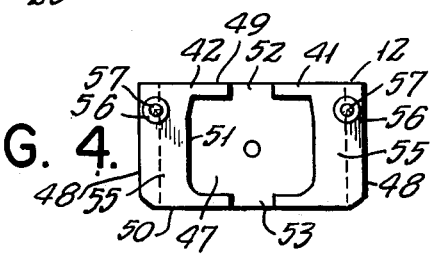
FIG. 4 is a corresponding end elevational view of the plug element.
Figure 5:
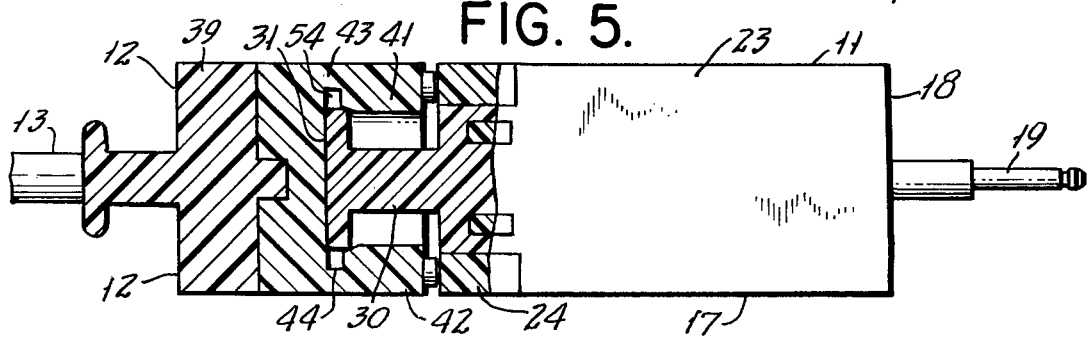
FIG. 5 is a transverse sectional view as seen from the plane 5—5 in FIG. 2.

Referring to FIG. 4 in the drawing, the members 41-42 jointly define a non-symmetrical recess 47 corresponding in configuration to that of the transverse member 31. Each member 41-42 is bounded by an outer surface 48, side surfaces 49 and 50 and an inner surface 51. A pair of longitudinally extending slots 52 and 53 terminate in a pair of laterally extending slots, one of which is indicated by reference character 54 at the end of the recess 47.

Referring to FIG. 4, extending from end surfaces 55 are conductive sockets 56 each mounting a resiliently urged sliding pin 57 which electrically communicates with the cord 13 through compressive springs (not shown).

The manner of engagement and disengagement of the elements 11 and 12 will be apparent from a consideration of FIG. 1. As the plug element 12 is moved toward the outer end of the module element 11, assuming correct orientation, the transverse member 31 slightly spreads the members 41-42 to permit the handle member 29 to enter the recess 47 and move to a point where the member 31 reaches the slots 54 at which time a detenting action occurs. During this movement, the pins 57 enter with substantial clearance the openings 26 and 27 to contact the terminals disposed therebeneath, following which appropriate test procedures are conducted. The procedures being completed, the plug element 12 is grasped by the manually engageable handle and moved outwardly. This movement slightly spreads the members 41-42, and permits withdrawal of the handle member 29 from engagement. With the withdrawal, the transverse member 31 is guided by the recess 47 in such manner that the pins 57 do not contact the edges of the openings 26 and 27, thereby permitting the withdrawal of the plug element 12 to be substantially frictionless.

I wish it to be understood that I do not consider the invention limited to the precise details of structure shown and set forth in this specification, for obvious modifications will occur to those skilled in the art to which the invention pertains.

I claim:

1. In a combination telephone protector module and test plug detachably engageable therewith to effect electrical communication therebetween, the improvement comprising: said module including a housing having an inner end providing means for the engagement thereof with a telephone connector block, and an outer end surface having openings therein providing access to electrically conductive terminals communicating with said inner end, a handle member mounted generally centrally on said outer end surface, said handle member having an enlargement thereon; said test plug having a cross sectional configuration generally corresponding to that of said housing of said module, and defining a recess extending outwardly from an inner end surface thereof sufficient to clear said handle upon engagement of said plug with said housing, and axially aligning said plug and said housing; a plurality of resiliently extendable pins on said plug projecting from said inner end surface thereof, and of effective cross sectional diameter substantially smaller than that of said openings in said outer end surface of said housing, said pins penetrating said openings upon engagement of said plug with said module, and effecting communication with said electrically conductive terminals without substantial contact with said openings; said handle and said plug having cooperative resilient detent means for maintaining said plug and housing in selectively engaged condition.

2. The improvement set forth in claim 1, further comprising: said handle having an enlargement thereon of non-symmetrical configuration, said recess being of non-symmetrical configuration corresponding to that of said enlargement, whereby said plug and said housing may be engaged only in a single mutual orientation.

3. The improvement set forth in claim 1, further comprising: said plug defining a pair of flexibly expandable engagement members adapted to surround said handle member and forming said detent means.

4. The improvement set forth in claim 3, further comprising: said enlargement being located at a free end of said handle member, said detent means including a laterally extending recess at the inner end of said first mentioned recess.

* * * * *